US012700169B2

(12) United States Patent
Li et al.

(10) Patent No.: US 12,700,169 B2
(45) Date of Patent: Aug. 4, 2026

(54) 3D TARGET POINT RENDERING METHOD AND APPARATUS, DEVICE, AND STORAGE MEDIUM

(71) Applicant: Beijing Zitiao Network Technology Co., Ltd., Beijing (CN)

(72) Inventors: Xiaofeng Li, Beijing (CN); Bowen Luo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 111 days.

(21) Appl. No.: 18/717,996

(22) PCT Filed: Dec. 6, 2022

(86) PCT No.: PCT/CN2022/136736
§ 371 (c)(1),
(2) Date: Jun. 7, 2024

(87) PCT Pub. No.: WO2023/103999
PCT Pub. Date: Jun. 15, 2023

(65) Prior Publication Data
US 2025/0046008 A1 Feb. 6, 2025

(30) Foreign Application Priority Data

Dec. 10, 2021 (CN) .......................... 202111506014.7

(51) Int. Cl.
*G06T 15/20* (2011.01)
*G06T 15/50* (2011.01)
*G06T 19/20* (2011.01)

(52) U.S. Cl.
CPC ............ *G06T 15/20* (2013.01); *G06T 15/506* (2013.01); *G06T 19/20* (2013.01); *G06T 2219/2016* (2013.01)

(58) Field of Classification Search
None
See application file for complete search history.

(56) References Cited

U.S. PATENT DOCUMENTS 8,676,856 B2 3/2014 Bruaset et al.
2013/0278600 A1* 10/2013 Christensen ............ G06T 19/20
345/420

(Continued)

FOREIGN PATENT DOCUMENTS

CN 105513112 A 4/2016
CN 107329671 A 11/2017

(Continued)

OTHER PUBLICATIONS

First Office Action for Chinese Application No. 202111506014.7, mailed on Oct. 31, 2024, 12 pages.

(Continued)

*Primary Examiner* — Ryan M Gray
(74) *Attorney, Agent, or Firm* — BakerHostetler

(57) ABSTRACT

Disclosed in the embodiments of the present disclosure are a three dimension (3D) target point rendering method, apparatus, a device and a storage medium. The method comprises: selecting and determining a preset number of mesh vertexes in a target model as initial 3D target points; acquiring first depth information of the initial 3D target points, and determining a non-hidden 3D target point based on the first depth information; determining a display size and a rotation angle of the non-hidden 3D target point; and rendering the non-hidden 3D target points based on the display size and the rotation angle.

20 Claims, 2 Drawing Sheets

(56) References Cited

U.S. PATENT DOCUMENTS

| 2017/0094262 A1* | 3/2017 | Peterson | G06T 15/205 |
| 2017/0186219 A1 | 6/2017 | Xu | |
| 2017/0358144 A1* | 12/2017 | Schwarz | G06F 3/017 |
| 2018/0196261 A1* | 7/2018 | Schickel | G06T 19/006 |
| 2019/0188902 A1* | 6/2019 | Doig | G06T 15/06 |
| 2020/0168005 A1* | 5/2020 | Brimhall | G06T 19/006 |
| 2020/0170617 A1 | 6/2020 | De Vaan et al. | |
| 2021/0074052 A1* | 3/2021 | Ha | G06T 15/00 |
| 2021/0141500 A1* | 5/2021 | Shults | G06F 3/04845 |

FOREIGN PATENT DOCUMENTS

| CN | 110163976 A | 8/2019 |
| CN | 111167120 A | 5/2020 |
| CN | 111640206 A | 9/2020 |
| CN | 114170363 A | 3/2022 |
| CN | 114170363 B | 6/2025 |

OTHER PUBLICATIONS

Hiyadi H., et al., "A Depth-based Approach for 3D Dynamic Gesture Recognition," 2015 12th International Conference on Informatics in Control, Automation, and Robotics (ICINCO), Dec. 2015. 9 pages.

International Search Report and Written Opinion for International Application No. PCT/CN2022/136736, mailed Feb. 28, 2023, 13 Pages.

Lingyu D., "Research and Application of Dynamic Display Effect of Information Based on Moire"; Shaanxi University of Science and Technology; Master's Degree Thesis; May 2020; 81 pages (contains English Abstract p. III-V).

International Patent Application No. PCT/CN2022/136736; Int'l Search Report; dated Feb. 28, 2023; 2 pages.

* cited by examiner

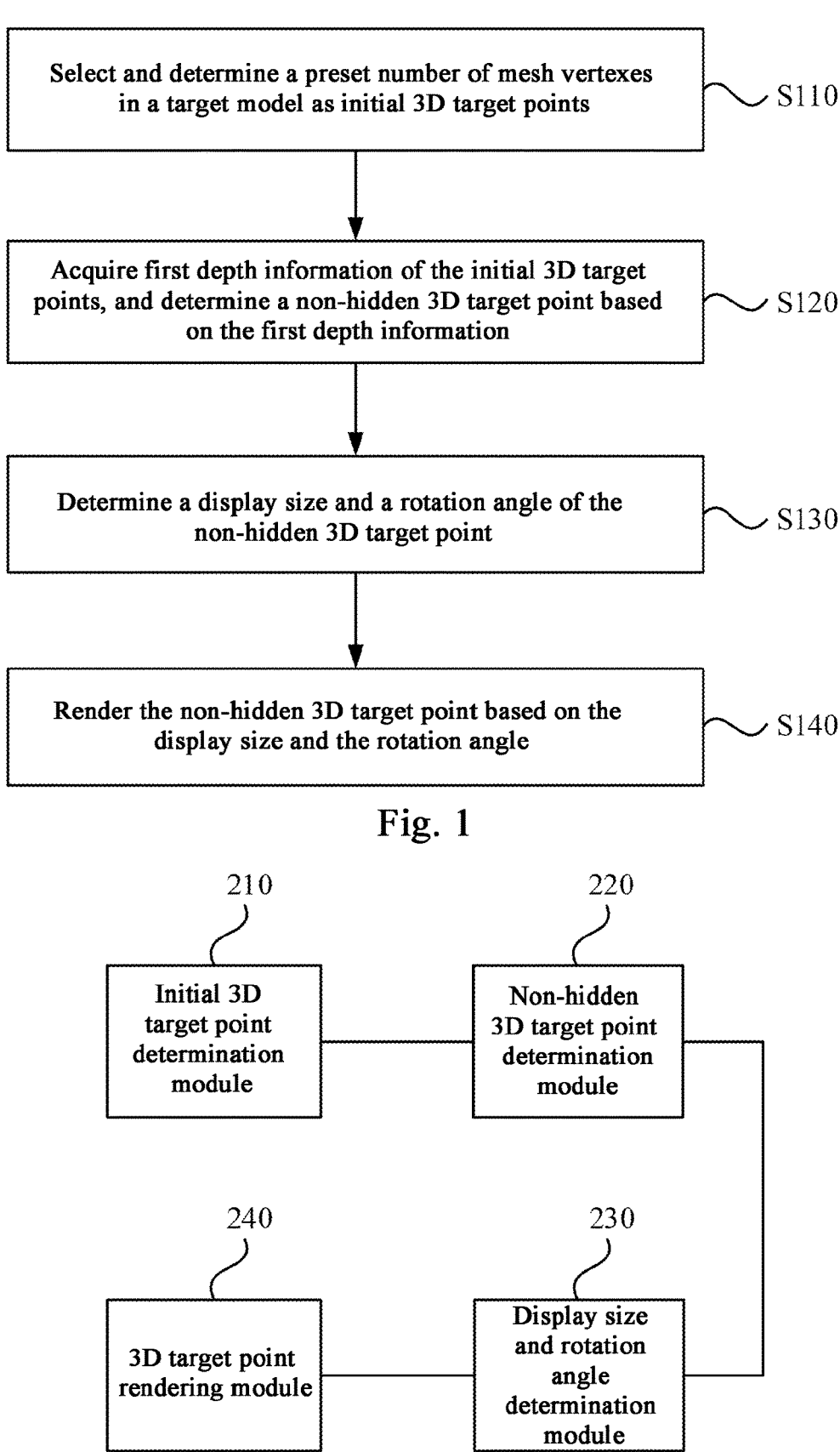

Select and determine a preset number of mesh vertexes in a target model as initial 3D target points ~S110

Acquire first depth information of the initial 3D target points, and determine a non-hidden 3D target point based on the first depth information ~S120

Determine a display size and a rotation angle of the non-hidden 3D target point ~S130

Render the non-hidden 3D target point based on the display size and the rotation angle ~S140

Fig. 1

210
Initial 3D target point determination module

220
Non-hidden 3D target point determination module 240
3D target point rendering module 230
Display size and rotation angle determination module

3D TARGET POINT RENDERING METHOD AND APPARATUS, DEVICE, AND STORAGE MEDIUM

CROSS-REFERENCE TO RELATED APPLICATION(S)

This application is a U.S. National Stage Application of PCT Application Serial No. PCT/CN2022/136736, filed Dec. 6, 2022, which claims priority to Chinese Patent Application No. 202111506014.7, filed with China National Intellectual Property Administration on Dec. 10, 2021, which are incorporated herein by reference in their entireties.

FIELD

Embodiments of the present disclosure relate to the technical field of image processing, and for example, relate to a three dimensional (3D) target point rendering method and apparatus, a device, and a storage medium.

BACKGROUND

A three dimensional (3D) target point rendering technology is mainly applied to render a target point of a virtual accessory model (e.g., a diamond ring model, a bracelet model, etc.). Material, size, brightness, flickering, amount, etc. of a target point may be customized.

SUMMARY

Embodiments of the present disclosure provide a 3D target point rendering method and apparatus, a device, and a storage medium, so as to implement rendering of 3D target points in a virtual accessory model, and improve a display effect of the virtual accessory model.

In a first aspect, an embodiment of the present disclosure provides a 3D target point rendering method, including:

selecting and determining a preset number of mesh vertexes in a target model as initial 3D target points;

acquiring first depth information of the initial 3D target points, and determining a non-hidden 3D target point based on the first depth information;

determining a display size and a rotation angle of the non-hidden 3D target point; and rendering the non-hidden 3D target point based on the display size and the rotation angle.

In a second aspect, an embodiment of the present disclosure further provides a 3D target point rendering apparatus, including:

an initial 3D target point determination module, configured to select and determine a preset number of mesh vertexes in a target model as initial 3D target points;

a non-hidden 3D target point determination module, configured to acquire first depth information of the initial 3D target points, and determine a non-hidden 3D target point based on the first depth information;

a display size and rotation angle determination module, configured to determine a display size and a rotation angle of the non-hidden 3D target point; and a 3D target point rendering module, configured to render the non-hidden 3D target point based on the display size and the rotation angle.

In a third aspect, an embodiment of the present disclosure further provides an electronic device. The electronic device includes:

at least one processing apparatus; and a storage apparatus, configured to store at least one program, the at least one program, when executed by the at least one processing apparatus, causes the at least one processing apparatus to implement the 3D target point rendering method according to any of embodiments of the present disclosure.

In a fourth aspect, an embodiment of the present disclosure further provides a computer-readable medium, storing a computer program, the program, when executed by a processing apparatus, implements the 3D target point rendering method according to the embodiments of the present disclosure.

BRIEF DESCRIPTION OF THE DRAWINGS

FIG. 1 is a flowchart of a 3D target point rendering method according to an embodiment of the present disclosure;

FIG. 2 is a structural schematic diagram of a 3D target point rendering apparatus according to an embodiment of the present disclosure.

DETAILED DESCRIPTION OF EMBODIMENTS

Figure 3:
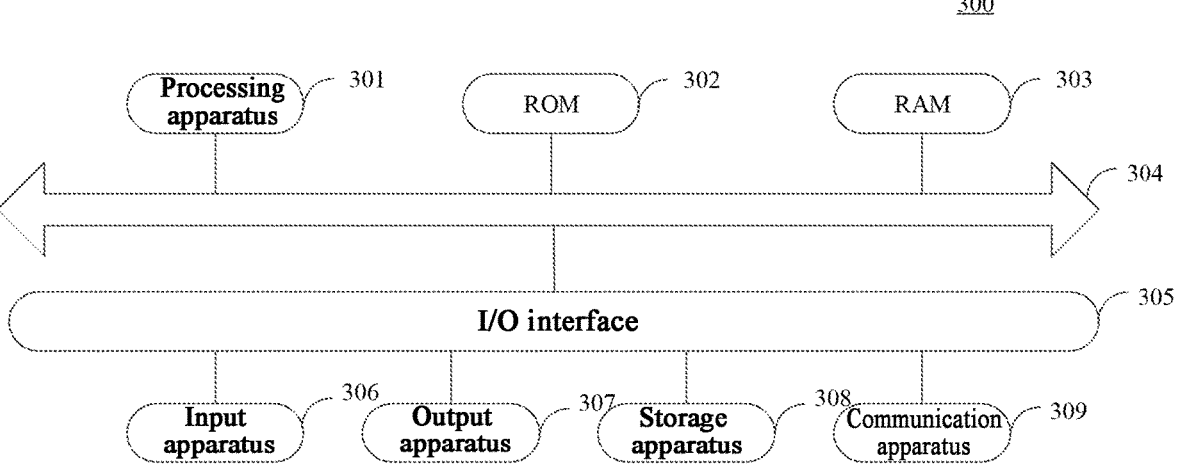
FIG. 3 is a structural schematic diagram of an electronic device according to an embodiment of the present disclosure.

The embodiments of the present disclosure will be described in more detail below with reference to the drawings. Although the drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the drawings and the embodiments of the present disclosure are for exemplary purposes only, and are not intended to limit the scope of protection of the present disclosure.

It should be understood that the steps recorded in the method implementations in the present disclosure may be performed in different orders and/or in parallel. In addition, the method implementations may include additional steps and/or omit the execution of the shown steps. The scope of the present disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments." The related definitions of other terms will be provided in the subsequent description.

It should be noted that "first," "second," and other concepts mentioned in the present disclosure are only for distinguishing different apparatuses, modules, or units, and are not intended to limit the order or relation of interdependence of functions performed by these apparatuses, modules, or units.

It should be noted that modifications such as "a" and "a plurality of" mentioned in the present disclosure are indicative rather than limiting, and those skilled in the art should understand that unless otherwise explicitly specified in the context, it should be interpreted as "at least one."

The names of messages or information exchanged between multiple apparatuses in the implementations of the present disclosure are provided for illustrative purposes only, and are not intended to limit the scope of these messages or information.

FIG. 1 is a flowchart of a 3D target point rendering method according to Embodiment 1 of the present disclosure. This embodiment is applicable to a case of rendering 3D target points on a target model. The method may be executed by a 3D target point rendering apparatus. The apparatus may be composed of hardware and/or software, and may be typically integrated in a device with a 3D target point rendering function. The device may be an electronic device, such as a server, a mobile terminal, or a server cluster. As shown in FIG. 1, the method includes the following steps:

Step 110: a preset number of mesh vertexes in a target model are selected and determined as initial 3D target points.

The set number may be set arbitrarily. A target point may be understood as a point with brightness exceeding a set brightness value. A target point may be called "sparkle point." The target model may be understood as a virtual three-dimensional model of an object with sparkle points under light illumination, such as a virtual model of an accessory made of metal, diamond, gemstone, and jade (e.g., a diamond ring, a gold bracelet, and a silver bracelet, etc.).

In this embodiment, the target model may be constructed based on 3D rendering technology. After the target model is constructed, the mesh vertexes of the target model may be obtained, and there are a plurality of the mesh vertexes. A preset number of mesh vertexes in the target model may be selected randomly or according to a set rule. Then target point primitives are placed in the selected set number of mesh vertexes to obtain the initial 3D target points.

Optionally, if the target model rotates, to make the rendered 3D target points more realistic, the initial 3D target points need to be updated. That is, a set number of mesh vertexes need to be reselected as updated initial 3D target points.

In this embodiment, after a preset number of mesh vertexes in a target model are selected and determined as initial 3D target points, the method further includes: acquiring a rotational angular velocity of the target model; and if the rotational angular velocity is greater than an angular velocity set value, updating the initial 3D target points.

The angular velocity set value may be set to any value between 0.05 rad/s and 0.1 rad/s. A method for obtaining the rotational angular velocity of the target model may include: acquiring a first rotation Euler angle of the target model in a previous frame and a second rotation Euler angle in a current frame; and determining the rotational angular velocity of the target model based on the first rotation Euler angle and the second rotation Euler angle.

The rotation Euler angle may include three parameters: a yaw angle (yaw), a pitch angle (pitch), and a roll angle (roll). Exemplarily, the rotational angular velocity of the target model determined according to the first rotation Euler angle and the second rotation Euler angle may be calculated according to the following equation:

$$\cos\theta = \frac{currentEuler \cdot lastEuler}{|currentEuler| \cdot |lastEuler|},$$

where "currentEuler" denotes the first rotation Euler angle, namely the rotation Euler angle in the previous frame, and "lastEuler" denotes the second rotation Euler angle, namely the rotation Euler angle in the current frame. After obtaining $\cos\theta$, the rotational angular velocity of the target model may be obtained. In this embodiment, by determining the rotational angular velocity through the rotation Euler angle, the accuracy of determining the rotational angular velocity can be improved.

When the rotational angular velocity is greater than the angular velocity set value, it indicates that the target model rotates significantly. A preset number of mesh vertexes in the target model are reselected and determined as initial 3D target points, thereby updating the initial 3D target points. Exemplarily, assuming that the angular velocity set value is 0.06 rad/s, when $\cos\theta$ is less than 0.999998, the rotational angular velocity of the target model is greater than 0.06 rad/s, and in this case, the initial 3D target points are updated. In this embodiment, when the rotational angular velocity of the target model is greater than the angular velocity set value, the initial 3D target points are updated, thereby improving the reality of displaying the 3D target points.

Step 120: first depth information of the initial 3D target points is acquired, and a non-hidden 3D target point is determined based on the first depth information.

The depth information of the 3D target points may be understood as depth information of the 3D target points in a camera coordinate system. In this embodiment, the depth information of the initial 3D target points needs to be compared with depth information of the target model, to determine whether the initial 3D target points are shielded. The shielded 3D target points need to be hidden, while the 3D target points that are not shielded need to be displayed.

Exemplarily, a method for determining a non-hidden 3D target point based on the first depth information may include: acquiring second depth information of the target model; determining an initial 3D target point with the first depth information less than or equal to the second depth information as the non-hidden 3D target point; and determining the initial 3D target points with the first depth information greater than the second depth information as the hidden 3D target points.

The second depth information of the target model may be represented by a center point of the target model. A step for acquiring the second depth information of the target model may include: acquiring coordinate information of the center point of the target model in a world coordinate system first; acquiring a transformation matrix between the world coordinate system and the camera coordinate system, obtaining coordinate information of the center point of the target model in the camera coordinate system world by left-multiplying world coordinate information of the target model by the obtained transformation matrix, and extracting depth information (namely the second depth information) of the target model from the camera coordinate system.

In this embodiment, the size of the initial 3D target points with the first depth information greater than the second depth information is set to be 0.0, and therefore the hidden 3D target points are obtained. The size of the initial 3D target points with the first depth information less than or equal to the second depth information is set to be an initial value, and therefore the non-hidden 3D target point is obtained. In this embodiment, by determining the shielded 3D target points based on the depth information and hiding the shielded 3D target points, the reality of displaying the 3D target points can be improved.

Step 130: a display size and a rotation angle of the non-hidden 3D target point are determined.

In this embodiment, the 3D target points are implemented by target point primitives. A target point primitive has attribute information such as a display size, a rotation angle and etc.

In this embodiment, there are a plurality of non-hidden 3D target points, and a different display size is assigned to each non-hidden 3D target point. Exemplarily, a process of determining a display size of the non-hidden 3D target points may include: acquiring a size range of the non-hidden 3D target points; and for each non-hidden 3D target point, selecting a size value within the size range as the display size of the non-hidden 3D target point.

The size range may be 0.2-1. In this embodiment, a method for selecting a size value within the size range as the display size of the non-hidden 3D target point may include: generating a random decimal by using any random function; taking a sine value of the random decimal and multiplying the sine value by a set value, so as to obtain a random size value. In this embodiment, when the size value within the size range is selected as the display size of the non-hidden 3D target point, the display size of the 3D target point may be limited within a certain range, avoiding a too large or too small 3D target point, such that the 3D target point is more natural and realistic.

The rotation angle may be an angle at which the target point primitive forming the 3D target point rotates around a center point of the target point primitive, and the center point of the target point primitive is the center point of the 3D target point.

Exemplarily, a method for determining a rotation angle of the non-hidden 3D target point may include: acquiring a first ray direction in which a virtual lamp is projected to a set plane and a second ray direction in which the center point of the target model is projected to the set plane; and determining an included angle between the first ray direction and the second ray direction as the rotation angle of the non-hidden 3D target point.

The virtual lamp may be a virtual lamp provided in a rendering tool. In the rendering tool, world coordinate information of the virtual lamp may be directly obtained. The set plane may be an xy plane in the world coordinate system. The first ray direction may be understood as a direction of a line connecting an origin of coordinates and a projection point of the virtual lamp on the xy plane, and the second ray direction may be understood as a direction of a line connecting the origin of coordinates and a projection point of the center point of the target model on the xy plane.

In this embodiment, the world coordinate information of the virtual lamp and the center point of the target model are respectively acquired. Then, the first ray direction in which the virtual lamp is projected to the set plane and the second ray direction in which the center point of the target model is projected to the set plane are acquired according to the world coordinate information. Finally, the included angle between the first ray direction and the second ray direction is determined as the rotation angle of the non-hidden 3D target point. In this embodiment, by taking the included angle between the ray directions in which the virtual lamp is projected to the xy plane and the center point of the target model is projected to the xy plane as the rotation angle, accuracy of the rotation angle can be improved.

Step 140: the non-hidden 3D target point is rendered based on the display size and the rotation angle.

Exemplarily, a process of rendering the non-hidden 3D target point based on the display size and the rotation angle may include: rotating the non-hidden 3D target point around its center point by the rotation angle; and rendering the rotated non-hidden 3D target point based on the display size.

In this embodiment, a rotation matrix is constructed based on the rotation angle. Assuming that the rotation angle is $\theta$, the rotation matrix is $$M(\theta) = \begin{bmatrix} \cos\theta & -\sin\theta \\ \sin\theta & \cos\theta \end{bmatrix},$$

and based on the rotation matrix, the non-hidden 3D target point is rotated. Assuming that coordinates of each pixel point in the non-hidden 3D target point are $(x0, y0)$ before rotation, coordinates of each pixel point in the non-hidden 3D target point are $(x1, y1)$ after rotation, and coordinates of the center point of each non-hidden 3D target point are $(m, n)$, a calculation equation for rotating the non-hidden 3D target point is:

$$x1 - m = (x0 - m)\cos\theta - (y0 - n)\sin\theta;$$

$$y1 - n = (x0 - m)\sin\theta - (y0 - n)\cos\theta.$$

In this embodiment, the non-hidden 3D target point is rendered based on the display size and the rotation angle, thereby the display effect of the 3D target point can be improved.

According to the technical solution of this embodiment, the preset number of mesh vertexes in the target model are selected and determined as the initial 3D target points; the first depth information of the initial 3D target points is acquired, and a non-hidden 3D target point is determined based on the first depth information; display size and rotation angle of the non-hidden 3D target point is determined; and the non-hidden 3D target point is rendered based on the display size and the rotation angle. The 3D target point rendering method provided according to embodiments of the present disclosure can implement rendering of the 3D target points in the virtual accessory model, and improve the display effect of the virtual accessory model.

FIG. 2 is a structural schematic diagram of a 3D target point rendering apparatus according to an embodiment of the present disclosure. As shown in FIG. 2, the apparatus includes:

an initial 3D target point determination module 210, configured to select and determine a preset number of mesh vertexes in a target model as initial 3D target points;

a non-hidden 3D target point determination module 220, configured to obtain first depth information of the initial 3D target points, and determine a non-hidden 3D target point based on the first depth information;

a display size and rotation angle determination module 230, configured to determine a display size and a rotation angle of the non-hidden 3D target point; and a 3D target point rendering module 240, configured to render the non-hidden 3D target point based on the display size and the rotation angle.

Optionally, the apparatus may further include an initial 3D target point update module, and the initial 3D target point update module is configured to:

acquire a rotational angular velocity of the target model; and update the initial 3D target points in response to determining that the rotational angular velocity is greater than an angular velocity set value.

Optionally, the initial 3D target point update module is further configured to:

acquire a first rotation Euler angle of the target model in a previous frame and a second rotation Euler angle in a current frame; and determine the rotational angular velocity of the target model based on the first rotation Euler angle and the second rotation Euler angle.

Optionally, the non-hidden 3D target point determination module 220 is further configured to:

acquire second depth information of the target model;

determine an initial 3D target point with the first depth information less than or equal to the second depth information as the non-hidden 3D target point; and determine the initial 3D target point with the first depth information greater than the second depth information as a hidden 3D target point.

Optionally, the display size and rotation angle determination module 230 is further configured to:

acquire a size range of non-hidden 3D target points; and select, for each non-hidden 3D target point, a size value within the size range as the display size of the non-hidden 3D target point.

Optionally, the display size and rotation angle determination module 230 is further configured to:

acquire a first ray direction in which a virtual lamp is projected to a set plane and a second ray direction in which a center point of the target model is projected to the set plane; and determine an included angle between the first ray direction and the second ray direction as the rotation angle of the non-hidden 3D target point.

Optionally, the 3D target point rendering module 240 is further configured to:

rotate the non-hidden 3D target point around its center point by the rotation angle; and render the rotated non-hidden 3D target point according to the display size.

The above apparatus may execute the method provided by all the foregoing embodiments, and has the corresponding functional modules for executing the above method. For technical details not described in detail in this embodiment, reference may be made to the method provided by all the foregoing embodiments of the present disclosure.

Refer to FIG. 3 below, FIG. 3 illustrates a structural schematic diagram of an electronic device 300 suitable for implementing embodiments of the present disclosure. The electronic device in this embodiment of the present disclosure may include but not limited to mobile terminals such as a mobile phone, a notebook computer, a digital radio receiver, a personal digital assistant (PDA), a portable Android device (PAD), a portable media player (PMP), and a vehicle-mounted terminal (e.g., a vehicle-mounted navigation terminal), fixed terminals such as a digital television (TV) and a desk computer, or various forms of servers such as a standalone server or a server cluster. The electronic device shown in FIG. 3 is merely an example, which should not impose any limitations on functions and application ranges of this embodiment of the present disclosure.

As shown in FIG. 3, the electronic device 300 may include a processing apparatus (e.g., a central processing unit and a graphics processing unit) 301, which may perform various appropriate actions and processing according to programs stored on a read-only memory (ROM) 302 or loaded from a storage apparatus 308 into a random access memory (RAM) 303. The RAM 303 further stores various programs and data required for the operation of the electronic device 300. The processing apparatus 301, the ROM 302, and the RAM 303 are connected to one another through a bus 304. An input/output (I/O) interface 305 is also connected to the bus 304.

Typically, the following apparatuses may be connected to the I/O interface 305: an input apparatus 306, including, for example, a touchscreen, a touchpad, a keyboard, a mouse, a camera, a microphone, an accelerometer, and a gyroscope; an output apparatus 307, including, for example, a liquid crystal display (LCD), a speaker, and a vibrator; a storage apparatus 308, including, for example, a magnetic tape and a hard drive; and a communication apparatus 309. The communication apparatus 309 may allow the electronic device 300 to be in wireless or wired communication with other devices for data exchange. Although FIG. 3 illustrates the electronic device 300 with various apparatuses, it should be understood that it is not necessary to implement or have all the shown apparatuses. Alternatively, more or fewer apparatuses may be implemented or provided.

Particularly, the foregoing process described with reference to the flowchart according to the embodiments of the present disclosure may be implemented as a computer software program. For example, an embodiment of the present disclosure includes a computer program product, including a computer program carried on a computer-readable medium. The computer program includes program code for executing a word recommendation method. In this embodiment, the computer program may be downloaded and installed from the network by the communication apparatus 309, or installed from the storage apparatus 308, or installed from the ROM 302. The computer program, when executed by the processing apparatus 301, performs the above functions limited in the method in this embodiment of the present disclosure.

It should be noted that the computer-readable medium in the present disclosure may be a computer-readable signal medium, or a computer-readable storage medium, or any combination thereof. For example, the computer-readable storage medium may include but not limited to: electrical, magnetic, optical, electromagnetic, infrared, or semiconductor systems, apparatuses, or devices, or any combination thereof. More specific examples of the computer-readable storage medium may include but not limited to: an electrical connection with at least one wire, a portable computer disk, a hard drive, a random access memory (RAM), a read-only memory (ROM), an erasable programmable read-only memory (EPROM or a flash memory), fiber optics, a portable compact disc read-only memory (CD-ROM), an optical storage device, a magnetic storage device, or any proper combination of the above. In the present disclosure, the computer-readable storage medium may be any tangible medium including or storing a program, and the program may be used by an instruction execution system, apparatus, or device, or used in conjunction with the instruction execution system, apparatus, or device. However, in the present disclosure, the computer-readable signal medium may include data signals propagated in a baseband or propagated as a part of a carrier wave, which carry computer-readable program code. The propagated data signals may have a plurality of forms, including but not limited to electromagnetic signals, optical signals, or any proper combination of the above. The computer-readable signal medium may be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including but not limited to a wire, an optical cable, radio frequency (RF), etc., or any proper combination of the above.

In some implementations, the client and the server may communicate using any currently known or future-developed network protocols such as a hypertext transfer protocol (HTTP), and may also be may be in communication connection with digital data in any form or medium (e.g., a communication network). For example, the communication network includes a local area network (LAN), a wide area network (WAN), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries at least one program. The at least one program, when executed by the electronic device, causes the electronic device to: select and determine a preset number of mesh vertexes in a target model as initial 3D target points; acquire first depth information of the initial 3D target points, and determine a non-hidden 3D target point based on the first depth information; determine a display size and a rotation angle of the non-hidden 3D target point; and render the non-hidden 3D target points based on the display size and the rotation angle.

The computer program code for executing the operations of the present disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the drawings illustrate system architectures, functions, and operations possibly implemented by the system, method and computer program product according to the various embodiments of the present disclosure. In this regard, each block in the flowcharts or block diagrams may represent a module, a program segment, or a portion of code, and the module, program segment, or portion of code includes one or more executable instructions for implementing specified logical functions. It should be noted that in some alternative implementations, functions marked in the blocks may also occur in an order different from that marked in the drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the present disclosure may be implemented through software or hardware. The name of the unit does not limit the unit in certain cases.

The functions described above in this specification may be at least partially executed by at least one hardware logic component. For example, exemplary hardware logic components that may be used include but not limited to a field programmable gate array (FPGA), an application specific integrated circuit (ASIC), application specific standard parts (ASSPs), a system on chip (SOC), a complex programmable logic device (CPLD), etc.

In the context of the present disclosure, a machine-readable medium may be a tangible medium that may contain or store a program, and the program may be used by the instruction execution system, apparatus, or device, or used in conjunction with the instruction execution system, apparatus, or device. The machine-readable medium may be a machine-readable signal medium or a machine-readable storage medium. The machine-readable medium may include but not limited to: electronic, magnetic, optical, electromagnetic, infrared, or semiconductor systems, apparatuses, or devices, or any proper combination of the above. More specific examples of the machine-readable storage medium may include: an electrical connection based on at least one wire, a portable computer disk, a hard drive, a random access memory (RAM), a read-only memory (ROM), an erasable programmable read only memory (EPROM or a flash memory), fiber optics, a portable compact disc read only memory (CD-ROM), an optical storage device, a magnetic storage device, or any proper combination of the above.

According to at least one embodiment of the present disclosure, an embodiment of the present disclosure discloses a three-dimensional (3D) target point rendering method, including:

selecting and determining a preset number of mesh vertexes in a target model as initial 3D target points;

acquiring first depth information of the initial 3D target points, and determining a non-hidden 3D target point based on the first depth information;

determining a display size and a rotation angle of the non-hidden 3D target point; and rendering the non-hidden 3D target point based on the display size and the rotation angle.

Optionally, after selecting and determining the preset number of mesh vertexes in the target model as initial 3D target points, the method further includes:

acquiring a rotational angular velocity of the target model; and updating the initial 3D target points in response to determining that the rotational angular velocity is greater than an angular velocity set value.

Optionally, acquiring a rotational angular velocity of the target model includes:

acquiring a first rotation Euler angle of the target model in a previous frame and acquiring a second rotation Euler angle in a current frame; and determining the rotational angular velocity of the target model based on the first rotation Euler angle and the second rotation Euler angle.

Optionally, determining the non-hidden 3D target point based on the first depth information includes:

acquiring second depth information of the target model;

determining an initial 3D target point with the first depth information less than or equal to the second depth information as the non-hidden 3D target point; and determining an initial 3D target points with the first depth information greater than the second depth information as a hidden 3D target point.

Optionally, determining a display size of the non-hidden 3D target point includes:

acquiring a size range of the non-hidden 3D target points; and for each of non-hidden 3D target points, selecting a size value within the size range as the display size of the non-hidden 3D target point.

Optionally, determining a rotation angle of the non-hidden 3D target point includes:

acquiring a first ray direction in which a virtual lamp is projected to a set plane and acquiring a second ray direction in which a center point of the target model is projected to the set plane; and determining an included angle between the first ray direction and the second ray direction as the rotation angle of the non-hidden 3D target point.

Optionally, rendering the non-hidden 3D target point based on the display size and the rotation angle includes:

rotating the non-hidden 3D target point around its center point by the rotation angle; and rendering the rotated non-hidden 3D target point based on the display size.

Optionally, the target point is a point with brightness exceeding a set brightness value.

According to at least one of embodiments of the present disclosure, an embodiment of the present disclosure further discloses a 3D target point rendering apparatus, including:

an initial 3D target point determination module, configured to select and determine a preset number of mesh vertexes in a target model as initial 3D target points;

a non-hidden 3D target point determination module, configured to acquire first depth information of the initial 3D target points, and determine a non-hidden 3D target point based on the first depth information;

a display size and rotation angle determination module, configured to determine a display size and a rotation angle of the non-hidden 3D target point; and a 3D target point rendering module, configured to render the non-hidden 3D target point based on the display size and the rotation angle.

According to at least one of embodiments of the present disclosure, an embodiment of the present disclosure further discloses an electronic device, including:

at least one processing apparatus; and a storage apparatus, configured to store at least one program, the at least one program, when executed by the at least one processing apparatus, causes the at least one processing apparatus to implement the three dimensional (3D) target point rendering method according to any of embodiments of the present disclosure.

According to at least one of embodiments of the present disclosure, an embodiment of the present disclosure further discloses a computer-readable medium. The computer-readable medium stores a computer program. The computer program, when executed by a processing apparatus, implements the three dimensional (3D) target point rendering method according to any of embodiments of the present disclosure.

We claim:

1. A three dimensional (3D) point rendering method, comprising:

selecting a preset number of mesh vertex points in a model as candidate locations for rendering a 3D point, wherein the model comprises a virtual 3D model of an object;

acquiring first depth information of each of the selected mesh vertex points;

determining a non-hidden mesh vertex point from the selected mesh vertex points based on the first depth information;

determining a display size and a rotation angle of the non-hidden mesh vertex point; and rendering a 3D point at the non-hidden mesh vertex point based on the display size and the rotation angle.

2. The method according to claim 1, wherein after selecting the preset number of mesh vertex points in the model, the method further comprises:

acquiring a rotational angular velocity of the model; and updating the candidate locations for rendering the 3D point in response to the rotational angular velocity being greater than an angular velocity set value.

3. The method according to claim 2, wherein acquiring the rotational angular velocity of the model comprises:

acquiring a first rotation Euler angle of the model in a previous frame and acquiring a second rotation Euler angle in a current frame; and determining the rotational angular velocity of the model based on the first rotation Euler angle and the second rotation Euler angle.

4. The method according to claim 1, wherein determining the non-hidden mesh vertex based on the first depth information comprises:

obtaining second depth information of the model;

determining an initial 3D target point with the first depth information less than or equal to the second depth information as the non-hidden mesh vertex point; and determining an initial 3D target point with the first depth information greater than the second depth information as a hidden mesh vertex point.

5. The method according to claim 1, wherein determining the display size of the non-hidden mesh vertex point comprises:

acquiring a size range of the non-hidden mesh vertex point; and selecting, for each of non-hidden mesh vertex points, a size value within the size range as the display size of the non-hidden mesh vertex point.

6. The method according to claim 1, wherein determining the rotation angle of the non-hidden mesh vertex point comprises:

acquiring a first ray direction in which a virtual lamp is projected to a set plane and ray direction a second ray direction in which a center point of the model is projected to the set plane; and determining an included angle between the first ray direction and the second ray direction as the rotation angle of the non-hidden mesh vertex point.

7. The method according to claim 1, wherein rendering the 3D point at the non-hidden mesh vertex point based on the display size and the rotation angle comprises:

rotating the non-hidden mesh vertex point around a center point of the non-hidden mesh vertex point by the rotation angle; and rendering the rotated non-hidden mesh vertex point based on the display size.

8. The method according to claim 1, wherein the rendered 3D point is a point with brightness exceeding a set brightness value.

9. An electronic device, comprising:

at least one processing apparatus; and a storage apparatus, configured to store at least one program, the at least one program, when executed by the at least one processing apparatus, causes electronic device to:

select a preset number of mesh vertex points in a model as candidate locations for rendering a 3D point, wherein the model comprises a virtual 3D model of an object;

acquire first depth information of each of the selected mesh vertex points;

determine a non-hidden mesh vertex point from the selected mesh vertex points based on the first depth information;

determine a display size and a rotation angle of the non-hidden mesh vertex point; and render a 3D point at the non-hidden mesh vertex point based on the display size and the rotation angle.

10. A non-transitory computer-readable medium, wherein the computer-readable medium stores a computer program, and the computer program, when executed by a processing apparatus cause the processing apparatus to:

select a preset number of mesh vertex points in a model as candidate locations for rendering a 3D point, wherein the model comprises a virtual 3D model of an object;

acquire first depth information of each of the selected mesh vertex points;

determine a non-hidden mesh vertex point from the selected mesh vertex points based on the first depth information;

determine a display size and a rotation angle of the non-hidden mesh vertex point; and render a 3D point at the non-hidden mesh vertex point based on the display size and the rotation angle.

11. The electronic device according to claim 9, wherein after selecting the preset number of mesh vertex points in the model, the electronic device is further caused to:

acquire a rotational angular velocity of the model; and update the candidate locations for rendering the 3D point in response to the rotational angular velocity being greater than an angular velocity set value.

12. The electronic device according to claim 11, wherein the at least one program causing the electronic device to acquire the rotational angular velocity of the model comprises a program causing the electronic device to:

acquire a first rotation Euler angle of the model in a previous frame and acquiring a second rotation Euler angle in a current frame; and determine the rotational angular velocity of the model based on the first rotation Euler angle and the second rotation Euler angle.

13. The electronic device according to claim 9, wherein the at least one program causing the electronic device to determine the non-hidden mesh vertex point based on the first depth information comprises a program causing the electronic device to:

obtain second depth information of the model;

determine an initial 3D target point with the first depth information less than or equal to the second depth information as the non-hidden mesh vertex point; and determine an initial 3D target point with the first depth information greater than the second depth information as a hidden mesh vertex point.

14. The electronic device according to claim 9, wherein the at least one program causing the electronic device to determine the display size of the non-hidden mesh vertex point comprises a program causing the electronic device to:

acquire a size range of the non-hidden mesh vertex point; and select, for each of non-hidden mesh vertex points, a size value within the size range as the display size of the non-hidden mesh vertex point.

15. The electronic device according to claim 9, wherein the at least one program causing the electronic device to determine the rotation angle of the non-hidden mesh vertex point comprises a program causing the electronic device to:

acquire a first ray direction in which a virtual lamp is projected to a set plane and ray direction a second ray direction in which a center point of the model is projected to the set plane; and determine an included angle between the first ray direction and the second ray direction as the rotation angle of the non-hidden mesh vertex point.

16. The electronic device according to claim 9, wherein the at least one program causing the electronic device to render the 3D point at the non-hidden mesh vertex point based on the display size and the rotation angle comprises a program causing the electronic device to:

rotate the non-hidden mesh vertex point around a center point of the non-hidden mesh vertex point by the rotation angle; and render the rotated non-hidden mesh vertex point based on the display size.

17. The electronic device according to claim 9, wherein the rendered 3D point is a point with brightness exceeding a set brightness value.

18. The non-transitory storage medium according to claim 10, wherein after selecting the preset number of mesh vertex points in the target model, the computer program further causes the processing apparatus to:

acquire a rotational angular velocity of the model; and update the candidate locations for rendering the 3D point in response to the rotational angular velocity being greater than an angular velocity set value.

19. The non-transitory storage medium according to claim 10, wherein the computer program causing the processing apparatus to determine the non-hidden mesh vertex point based on the first depth information comprises a program causing the processing apparatus to:

obtain second depth information of the model;

determine an initial 3D target point with the first depth information less than or equal to the second depth information as the non-hidden mesh vertex point; and determine an initial 3D target point with the first depth information greater than the second depth information as a hidden mesh vertex point.

20. The non-transitory storage medium according to claim 10, wherein the computer program causing the processing apparatus to determine the display size of the non-hidden mesh vertex point comprises a program causing the processing apparatus to:

acquire a size range of the non-hidden mesh vertex point; and select, for each of non-hidden mesh vertex points, a size value within the size range as the display size of the non-hidden mesh vertex point.

\* \* \* \* \*